United States Patent
Hendricks (10) Patent No.: US 9,675,142 B1
(45) Date of Patent: Jun. 13, 2017

(54) SNAP COVER CONVERTER

(71) Applicant: Erik S. Hendricks, Watkins, MN (US)

(72) Inventor: Erik S. Hendricks, Watkins, MN (US)

( * ) Notice: Subject to any disclaimer, the term of this patent is extended or adjusted under 35 U.S.C. 154(b) by 0 days.

(21) Appl. No.: 14/938,828

(22) Filed: Nov. 11, 2015

(51) Int. Cl.
  *B63B 17/02* (2006.01)
  *A44B 17/00* (2006.01)
  *A44B 13/00* (2006.01)

(52) U.S. Cl.
  CPC ...... *A44B 17/0023* (2013.01); *A44B 13/0058* (2013.01); *B63B 17/02* (2013.01)

(58) Field of Classification Search
  CPC ................................ B63B 17/00; B63B 17/02
  USPC .......................................................... 114/361
  See application file for complete search history.

(56) References Cited

U.S. PATENT DOCUMENTS

| 2,716,433 | A | 8/1955 | Rawlings |
| 2,764,765 | A | 10/1956 | Woodruff, Sr. |
| 3,079,657 | A | 3/1963 | Russell |
| 4,305,171 | A | 12/1981 | Pettersson |
| 5,483,915 | A | 1/1996 | Clark |
| 5,913,479 | A | 6/1999 | Westwood, III |
| 7,290,312 | B2 * | 11/2007 | Kawensky .............. B63B 17/02 24/301 |
| 8,402,618 | B2 | 3/2013 | Veldhoen |
| 2005/0115487 | A1 * | 6/2005 | Godfrey ................. B63B 17/02 114/361 |
| 2008/0216735 | A1 | 9/2008 | Boyd |

* cited by examiner

*Primary Examiner* — Lars A Olson
(74) *Attorney, Agent, or Firm* — Albert W. Watkins (57) ABSTRACT

A snap cover converter couples a boat cover to a boat. The converter has a snap portion that snaps to a mating snap portion on the cover, and will remain snapped thereto until a person removes the snap cover converter. A loop, when secured, extends from the snap portion snapped to the cover to and about either one of a male snap member affixed to a boat, or a knob that may be used in addition to or to replace a prior art snap member. The knob has a top, a base, and a shoulder intermediate between top and base that together engage securely with an opening in the loop. In one preferred embodiment, the loop opening is keyhole shaped, and the knob top has a generally cylindrical exterior of a diameter greater than the knob shoulder and less than a diameter of the knob base.

16 Claims, 4 Drawing Sheets

SNAP COVER CONVERTER

BACKGROUND OF THE INVENTION

1. Field of the Invention

The present invention pertains generally to protective boat covers, and more particularly to a snap converter for a boat cover.

2. Description of the Related Art

Smaller recreational boats are used for many different activities, including but not limited to transportation, racing, fishing, water skiing, sightseeing, and simply enjoying the fresh air and cooler temperatures of a lake on a hot summer's day. As a result of the different applications and interests of boat owners, boats have been devised with many different hull designs and geometries. Nevertheless, most smaller water craft have a hull that presents a solid lower surface that keeps the water out, and an at least partially open top into which people and gear may be loaded. When the boat is not in use, this opening in the top side combined with the enclosed bottom means that the boat interior can become filled with water, and since this water is stagnant, it can putrefy quickly. This can result in stains and odors that may be extremely difficult to remove. Noteworthy here is that the area being spoiled is the very same area that is intended to be occupied by people. Furthermore, if the water is allowed to accumulate unchecked, such as when a drain plug is inadvertently left in the drain hole, the boat may fill with liquid and quickly overload a trailer or the hull, causing damage. In colder climates, the water may take the form of snow and ice, each which is also capable of causing significant damage to the boat interior. Finally, the open exposure can lead to solar damage, and contamination from leaves, dust, bird droppings, and other external matter, once again in the area intended to be occupied.

To protect the boat, as well as any gear or equipment stored therein, from the many adverse effects that come from leaving the boat interior exposed, manufacturers have long produced covers that can be used to more completely enclose a boat interior from the elements. These covers are typically produced from a flaccid material such as a tarp, canvas, or other cloth or covering. The cover will typically be cut in the shape of the top rim of the opening, and may commonly also have snaps that are provided to connect the edges of the cover to the boat opening top rim. In addition to keeping unwanted matter out of the boat, the covers have also proved to be useful keeping gear inside, such as when the boat is carried upon a trailer with gear and supplies stored within the boat.

When a person wishes to use the boat, they will commonly first separate the cover from the boat, such as by unsnapping the cover from the boat, and then they will stow the cover in some storage location either within or outside of the boat. The boat may then be boarded, and used as desired. When the boater is finished boating and is ready to store the boat, the cover will then be retrieved from storage and fastened onto the boat top rim.

A number of patents illustrate various covers and fasteners, the teachings and contents which are incorporated herein by reference, including: U.S. Pat. No. 2,716,433 by Rawlings, entitled "Weather protective covering for automobile bodies"; U.S. Pat. No. 2,764,765 by Woodruff, Sr., entitled "Boat cover"; U.S. Pat. No. 4,305,171 by Pettersson, entitled "Device for securing a fabric material to a support surface"; U.S. Pat. No. 5,483,915 by Clark, entitled "Snap extender for a boat canvas"; U.S. Pat. No. 8,402,618 by Veldhoen, entitled "Fastening device"; and 2008/0216735 by Boyd, entitled "Protective cover for a boat". Two additional patents illustrate alternative fasteners that may be used with tarpaulins and the like: U.S. Pat. No. 3,079,657 by Russell, entitled "Fastening device"; and U.S. Pat. No. 5,913,479 by Westwood, entitled "Snap hook with pivotal gate".

Unfortunately, while snaps are generally very convenient, they can require a significant amount of force to engage. This is particularly true during cooler weather or when first coming out of cold water, when a person's hands may be less effective. Even in the best of weather conditions, the snaps are very difficult to judge visually to be sure they are, in fact, properly engaged. In addition, the elderly, younger individuals, and anyone with less strength or manual dexterity may find it extremely difficult or impossible to properly engage the snaps. Finally, the male snap protrudes from the boat and is therefore susceptible to damage that may cause it to be malformed. If either the male or female snap components are deformed, the pairing becomes impossible. What is desired then is an apparatus that can be used to facilitate the engaging of the boat cover with a boat in a manner that is secure, easily manipulated, and which can be visually checked to confirm proper engagement.

In addition to the aforementioned patents, Webster's New Universal Unabridged Dictionary, Second Edition copyright 1983, is incorporated herein by reference in entirety for the definitions of words and terms used herein.

SUMMARY OF THE INVENTION

In a first manifestation, the invention is, in combination, a boat, a boat cover, and snap cover converter. The boat has a hull providing buoyancy upon a water surface, and a knob affixed to and protruding from the boat. The boat cover has a weather resistant covering, and a first snap portion secured to the covering. The snap cover converter has a second snap portion removably mated with the boat cover first snap portion, and a loop affixed to the second snap portion having a loop opening. The loop and knob in a first configuration are selectively coupled together and in a second configuration are disconnected from each other. The boat cover is secured to the boat through the snap cover converter in the first configuration.

In a second manifestation, the invention is a snap cover converter. A snap portion has a connector of a one of a male snap connector and a female snap connector, and may be removably mated with the other of the male and female snap connectors. A loop is affixed to the snap portion and has a loop opening. The loop opening has a first portion with a diameter great enough to operatively receive and pass through an object having a first diameter, while blocking an object having a diameter greater than the first diameter. The loop opening also has a second portion in communication with the first portion that is configured to operatively receive and pass through an object of a diameter less than the first diameter, while blocking an object having a diameter equal to the first diameter. A hand grip is secured to the loop and configured for manual grasping and manipulation. When the snap portion is removably mated with the other of the male and female snap connectors, a person may grasp the hand grip and align the loop opening with an object of first diameter and pass the object of first diameter through the loop opening.

In a third manifestation, the invention is a knob configured to convert a snap cover to an alternative coupler. A knob top has a generally cylindrical exterior of a first diameter. A knob base has a generally cylindrical exterior of a second diameter greater than the knob top first diameter. A knob shoulder has a generally cylindrical exterior of a third diameter greater than the second diameter and less than the first diameter. The knob shoulder is located intermediate between the knob top and knob base. A snap receiver is defined in the knob base and is adapted to operatively snap about a male snap connector.

OBJECTS OF THE INVENTION

Exemplary embodiments of the present invention solve inadequacies of the prior art by providing a snap cover converter having a snap portion that snaps to a mating snap portion on a cover, and which will remain snapped thereto unless or until a person specifically removes the snap cover converter. The snap cover converter has a loop that, when secured, extends from the snap portion snapped to the cover to and about either one of the prior art male snap member affixed to a boat or other object, or a knob that may be used instead of or to replace a prior art snap member.

The present invention and the embodiments illustrated and described herein have been developed with a number of objectives in mind. While not all of these objectives may necessarily be found in every embodiment, these objectives nevertheless provide a sense of the general intent and the many possible benefits that are available from embodiments of the present invention.

A first object of the invention is to provide a snap cover converter that securely holds a cover to a boat even when the cover is loose. A second object of the invention is to simplify and speed the process of putting the cover on and removing the cover from the boat. Another object of the present invention is to enable a person to affix some or all of the cover from inside the boat. A further object of the invention is to provide a simple and low cost, small, reliable and rugged snap cover converter that will not mar or otherwise harm a boat's finish. Yet another object of the present invention is to provide a snap cover converter that will hold a cover away from a boat. A further object of the invention is to facilitate the engaging of the boat cover with a boat in a manner that is easily manipulated, and which can be visually checked to confirm proper engagement, and thereby enable persons with less strength or manual dexterity than would be required to fasten a snap cover to be able to secure the snap cover when used in combination with the present invention. Another object of the present invention is to provide a snap converter that may remain affixed to a snap cover, and which will be more resistant to damage or deformation than a prior art snap fastener. An additional object of some embodiments of the present invention is to provide a snap cover converter that will float, in case the snap cover converter is accidentally dropped into the water.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Figure 4:
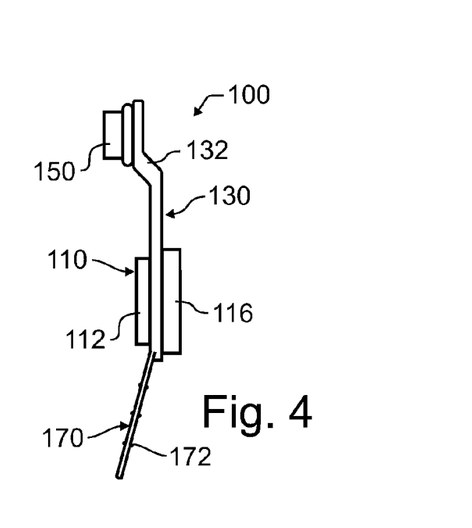
FIG. 4 illustrates the preferred embodiment snap cover converter of FIG. 1 from a right side elevational view.
Figure 5:
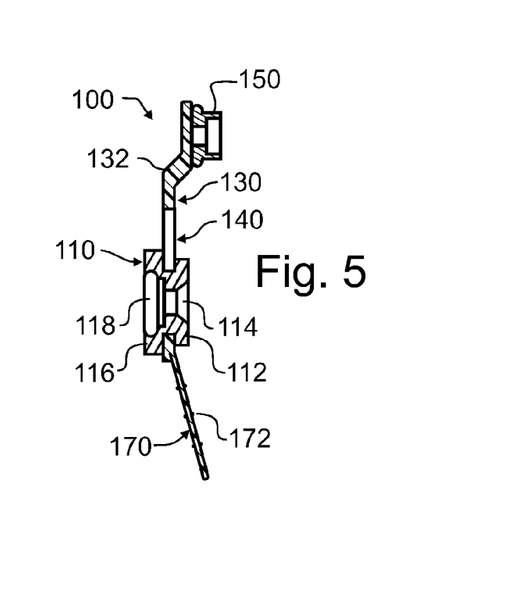
FIG. 5 illustrates the preferred embodiment snap cover converter of FIG. 1 from a sectional view taken along line 5' of FIG. 3.
Figure 6:
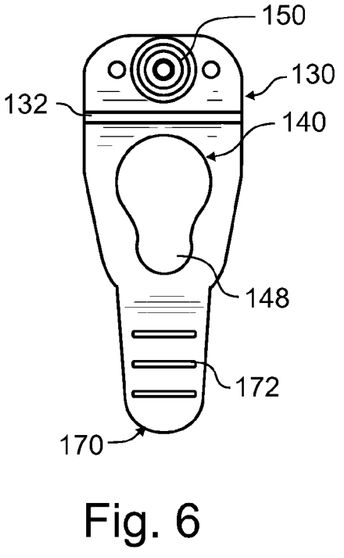
FIG. 6 illustrates a preferred embodiment loop used in the snap cover converter of FIG. 1, shown from a front elevational view.
Figure 7:
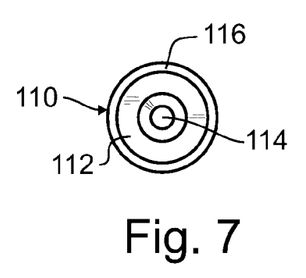
FIG. 7 illustrates a preferred embodiment knob used in the snap cover converter of FIG. 1, shown from a front elevational view.
Figure 8:
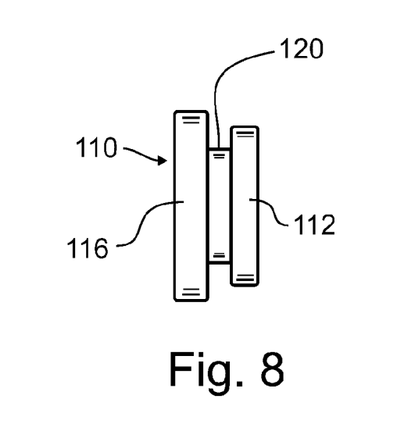
FIG. 8 illustrates a preferred embodiment knob used in the snap cover converter of FIG. 1, shown from a left side elevational view.

Manifested in the first preferred embodiment of the invention illustrated in FIGS. 1-5, a snap cover converter 100 comprises two separable components, a loop 130 and a knob 110. The loop 130, which is also illustrated individually in FIG. 6, is operatively coupled or attached to a boat cover. The knob 110, which is also illustrated individually in FIGS. 7 and 8, is operatively coupled or attached to a boat, such as the upper portion of the boat hull, also commonly referred to as the gunnel or gunwale. The loop 130 and knob 110 may then be easily coupled together to affix a boat cover to a boat. The loop 130 and knob 110 are also easily selectively separated from each other, allowing the cover to be installed or removed from the boat when desired.

When using preferred embodiment snap cover converter 100, male snap portion 150 at the top of loop 130 is coupled to a female snap portion found around the periphery of prior art boat covers. While a female snap is very common for prior art boat covers, the present invention is not so limited, and it will be understood that the loop 130 may alternatively have a female snap portion at the top, designed to couple with a male snap portion if so provided on a boat cover. Furthermore, and recognizing that the function of the snap is to couple with a boat cover, in an alternative embodiment loop 130 may be directly affixed to the boat cover instead of the prior art snap member, such as by riveting, sewing or through any other suitable fastener. Male snap portion 150 is provided in first preferred embodiment snap cover converter 100 as illustrated herein, since there are currently a large number of boat covers in use that have the female snap portion already affixed to the cover and so male snap portion 150 will directly couple with these existing covers.

Loop 130 may for exemplary and non-limiting purposes comprise a molded polymer such as nylon. While a pure polymer may work for some intended applications, the present inventor recognizes that many polymers, when pulled on for an extended period, will tend to flow or deform. To overcome or reduce this phenomenon, and to increase the strength of loop 130 without increasing the amount of plastic material required, nylon or other polymer may preferably have additional reinforcing or strengthening material added thereto, such as glass fibers, other fibers, or other known additives. Glass fibers may also be used to thin the loop and thereby increase the flexibility of the loop body. In addition, these fibers will better resist the formation or propagation of a crack through loop 130. In addition to the fibers, and dependent upon the particular material used for loop 130, other known additives such as plasticizers, ultraviolet light inhibitors, and any other beneficial additives may be incorporated.

The use of glass infused or glass-filled nylon or other preferred polymer-based compositions ensures that loop 130 will not damage or harm a boat in any way, even if a person accidentally forgets to attach one loop 130 and knob 110 together when installing a cover. In contrast, prior art metal snaps may flap in the wind and contact the boat, potentially scuffing or marring the finish on the boat. Consequently, it is preferred to select both the polymer and the additives incorporated therein to avoid scuffing, marring, or marking of a boat's finish.

While in the preferred embodiment illustrated, loop 130 is formed of plastic owing to the ease of forming through well known molding, stamping or other suitable plastic forming processes, and the non-marring nature of the material, it will be recognized that in alternative embodiments, other materials may be substituted therefor. In alternative embodiments, various fabrics, cloths, laminates, composites, or the like are contemplated. However, in the event that a material such as a metal is used that would be capable of marring the boat finish, it is preferred to provide an exterior coating, such as a sufficiently thick powder coat, dipped coating, or the like that adequately isolates the metal and thereby protects the finish.

Loop 130 is so named owing to the generally centrally located opening 140. Loop opening 140 in this preferred embodiment takes the shape of a keyhole. The large diameter portion of opening 140 is sized to allow knob top 112 to pass through, while the diameter is preferably smaller than knob base 116. This means that a person may pull on hand grip 170 to stretch the cover and align the larger portion of loop opening 140 over knob top 112, and then push loop 130 toward knob base 116. Friction ribs 172 may optionally be provided in hand grip 170 to facilitate manually grasping and pulling. Other means to improve manual grasping of hand grip 170 may be provided and are contemplated herein in alternative embodiments, including geometric changes, surface finish, surface treatments, or even compositional changes.

Figure 1:
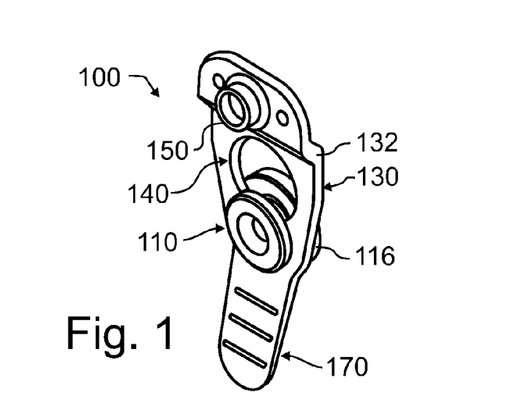
FIG. 1 illustrates a first preferred embodiment snap cover converter designed in accord with the teachings of the present invention from a projected view.
Figure 2:
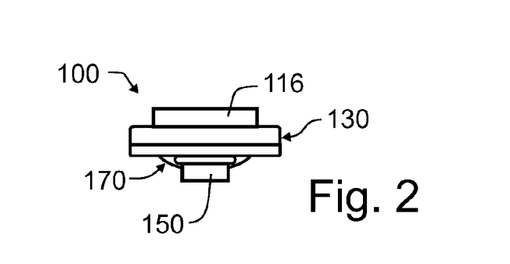
FIG. 2 illustrates the preferred embodiment snap cover converter of FIG. 1 from a top plan view.
Figure 3:
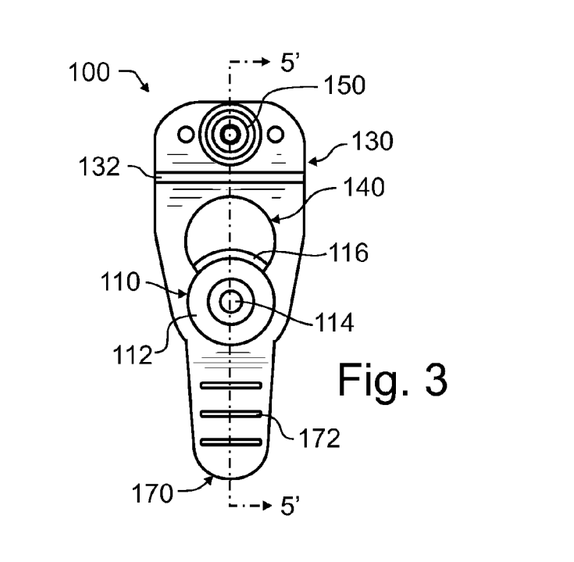
FIG. 3 illustrates the preferred embodiment snap cover converter of FIG. 1 from a front elevational view.

When loop 130 contacts knob base 116, it will not travel any closer to a boat hull. Knob base 116 will not pass through any part of loop opening 140, and so knob base 116 acts as a spacer between the boat and cover. In addition, and as illustrated in FIGS. 1, 4, and 5, there is a small bend in loop 130 between loop opening 140 and snap 150, which also helps to displace the cover from the boat. Consequently, preferred embodiment snap cover converter 100 will hold the cover away from the boat.

When the person next releases hand grip 170, tension on the cover will pull loop 130 up, shifting knob top 112 toward hand grip 170. This shift is to the position illustrated in FIGS. 1-5, and in this position knob top 112 is larger than the size of the narrowed loop opening portion 148, thereby preventing loop 130 from coming off of knob top 112. The use of a loop 130 having an opening 140 and a knob 110 able to partially pass through the loop 130 enables a person to grasp loop 130 and pull loop opening 140 into position very quickly, and to similarly pull loop opening 140 from knob 110 also very quickly. As may be apparent then, first preferred embodiment snap cover converter 100 simplifies and speeds the process of putting a cover on and removing the cover from a boat. In addition, the hand grip 170 and simple fastening enable a person to affix some or all of the cover from inside a boat, even when the person cannot see the knob 110 or loop 130.

If there is relatively tight tolerance kept during the manufacture of loop 130 and knob 110, then the thickness of loop 130 will match the thickness of knob shoulder 120, or in other words, the gap between knob top 112 and knob base 116. Alternatively or additionally, the inside diameter of narrowed loop opening portion 148 may tightly match the outside diameter of knob shoulder 120. In either case, a tight fit may be used to generate some friction between knob 110 and loop 130, tending to hold loop 130 in the position illustrated in FIGS. 1-5 even if the cover does not provide tension that would otherwise pull loop 130 and knob 110 into this position.

Additionally, and where desired, various ribs or other surface textures, finishes and materials may optionally be provided, if desired, in the vicinity of the contact points between knob 110 and loop 130, to further create a tendency for these components to hold in place. In one alternative embodiment illustrated for exemplary and non-limiting purpose in FIG. 9, there is provided a retention rib 142 of slightly greater thickness than that of most of the balance of loop 130, located just above the position of knob 110 in FIGS. 1-5. By providing a rib 142 thicker than loop 130 just above knob 110, then removing loop 130 from knob 110 will require a slight amount of deformation of either knob 110 or loop 130. This will keep knob 110 and loop 130 together during transport and storage of the boat and cover, but will also allow knob 110 and loop 130 to be easily pulled apart when it is desired to use the boat on the water or otherwise access the boat interior. This retention rib 142 operates between the generally planar face of loop 130 and knob top 112, adjacent to knob shoulder 120.

Figure 9:
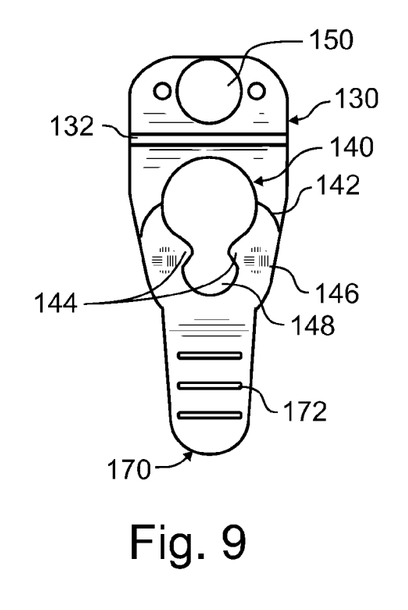
FIG. 9 illustrates a first alternative embodiment loop, shown from a front elevational view.
Figure 10:
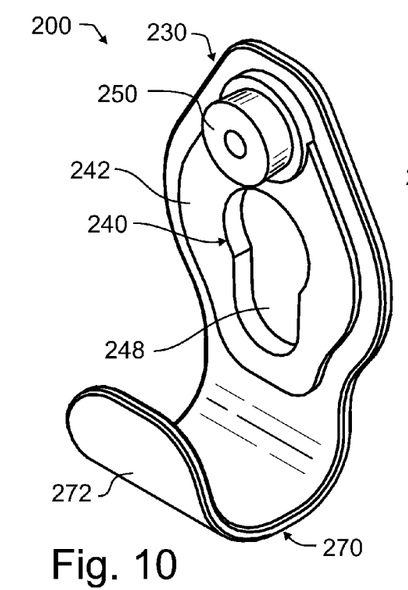
FIG. 10 illustrates a second preferred embodiment snap cover converter designed in accord with the teachings of the present invention from a projected view.
Figure 11:
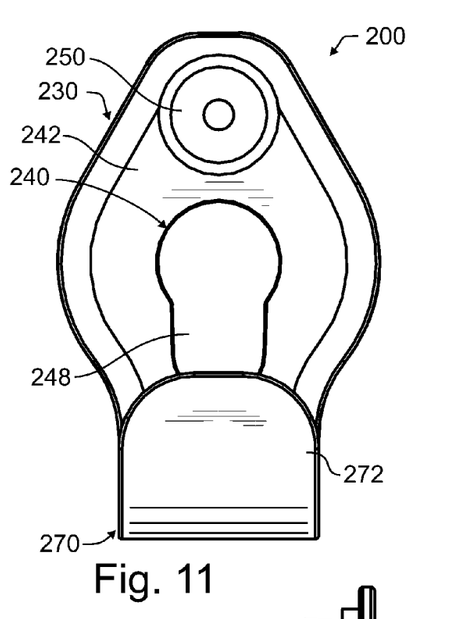
FIG. 11 illustrates the second preferred embodiment snap cover converter of FIG. 10 from a front elevational view.
Figure 12:
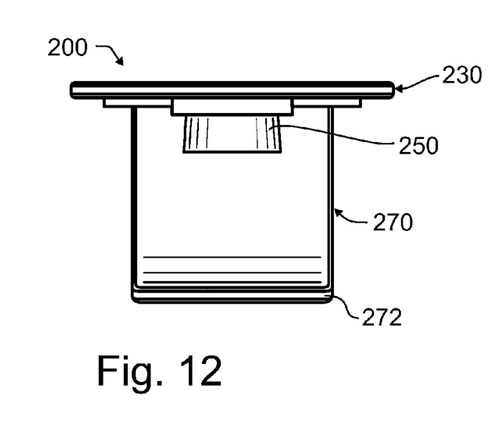
FIG. 12 illustrates the second preferred embodiment snap cover converter of FIG. 10 from a top plan view.
Figure 13:
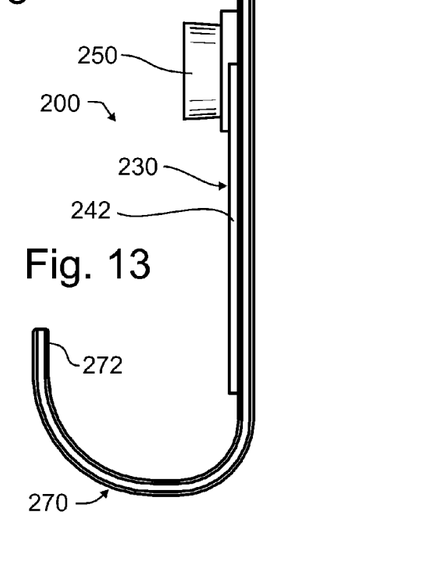
FIG. 13 illustrates the second preferred embodiment snap cover converter of FIG. 10 from a side elevational view.

An alternative or additional retention feature may be provided by one or more retention teeth 144. These teeth 144 are designed to narrow the loop opening 140, thereby creating either a snap effect as knob shoulder 120 passes through the most narrowed region of retention teeth 144 from the larger portion of loop opening 140 into the narrowed loop opening portion 148, or, if so desired, a plurality of teeth 144 may be provided that successively engage knob shoulder 120.

FIG. 9 also illustrates a friction finish 146 which may alternatively or additionally be provided immediately adjacent to knob top 112 when knob top 112 is in the position of FIGS. 1-5. This friction finish 146 for exemplary and non-limiting purposes may be a roughened surface, a slightly thicker surface or layer, a plurality of small ribs similar to the retention ribs, a material of different composition having a greater coefficient of friction than the loop, or other suitable or equivalent feature. As with the retention rib 142, the purpose is to ensure improved engagement in this region of loop 130 between loop 130 and knob 110, to keep loop 130 and knob 110 secured together.

The use of close tolerances between knob 110 and loop 130 help to ensure that a snap cover converter 100 may keep the cover secured to the boat, even when the cover is loose. Retention ribs 142, friction finish 146, and other like features may be used to reduce the required precision of tolerances between knob 110 and loop 130, and may also be used to increase the forces required to separate loop 130 from knob 110. A designer reasonably skilled in the art will select from these features and an acceptable precision of tolerances as appropriate for a given design, material, and preferred method of fabrication.

A preferred knob 110 is illustrated separately from loop 130 in FIGS. 7 and 8. The knob 110, as already noted, has a knob base 116, a knob top 112, and a reduced diameter knob shoulder 120 between the base 116 and top 112. In one application, the knob 110 may be mounted to the boat using a screw, to completely replace an existing fastener on the boat. To accommodate this option, a screw hole 114 visible in FIGS. 5 and 7 is provided that extends entirely through the knob from the knob top 112 to the knob base 116. The knob top 112 is preferably provided with a suitable countersink, so in the preferred embodiment this countersink is tapered to receive a conical head such as found on most wood screws.

In another application, which does not require any tools for installation, knob 110 will be snapped over the top of an existing male snap portion on the gunnel. To facilitate this, a snap receiver 118 visible in FIG. 5 is provided, and knob 110 can then be snapped into place once, and remain there indefinitely. Furthermore, when snaps 150 illustrated in the preferred embodiment snap cover converter 100 are used, snap cover converter 100 may also be removed from one cover and used on another cover. This means that snap cover converter 100 can outlive a boat cover, or even a boat.

As illustrated, each section of knob 110 is both coaxial and cylindrical, including knob top 112, knob base 116, and knob shoulder 120. This permits screw hole 114 to pass centrally through each of these sections, and makes the orientation of knob 110 irrelevant with regard to the cylindrical exterior. While this coaxial and cylindrical arrangement is preferred, it will be understood that knob top 112, knob base 116, and knob shoulder 120 do not need to be coaxial. If desired, in alternative embodiments these components may be axially offset from each other, and the axes may even be non-parallel.

Likewise, knob top 112, knob base 116, and knob shoulder 120 do not have to be cylindrical, and may take on other geometries. Most preferable, however, is that the knob top 112 can pass through loop opening 140, while knob base 116 can not. Similarly, knob shoulder 120 is preferably the only section that will fit into narrowed loop opening portion 148.

From the foregoing figures and description, several additional features and options become more apparent. First of all, a preferred embodiment snap cover converter 100 may be manufactured from a variety of materials, including metals, resins and plastics, ceramics or cementitious materials, or even combinations or composites of the above. The specific material used may vary, though special benefits are attainable if several important factors are taken into consideration. First, a preferred embodiment snap cover converter 100 will preferably be non-marring to the finish of a boat. In addition, and where desired, snap cover converter 100 may also be manufactured with rounded edges to better protect a boat and a person's hands from sharp edges. Furthermore, owing to the likelihood for extensive exposure to the sun, precipitation, and a wide environmental temperature range, the material used will preferably be suitable through a wide temperature range and be capable of withstanding solar exposure and temperature extremes. It is also preferable that all materials are sufficiently tough and durable to not fracture, even when great forces are applied thereto. In the case of preferred embodiment snap cover converter 100, a preferred material is glass filled or glass-infused nylon, which has the advantages of being stain resistant, extremely tough and durable to withstand great force, scuff resistant, non-marring, and readily colored to any desired color.

Yet another objective in some embodiments contemplated herein is to provide a snap cover converter 100 that will float, in case snap cover converter 100 is accidentally dropped into the water. Again, with appropriate selection of materials, such as a number of plastics but also including structural foams and other materials, the density of a snap cover converter can be designed to be less than that of salt water, or if so desired, less than that of fresh water.

Various embodiments of apparatus designed in accord with the present invention have been illustrated in the various figures. The embodiments are distinguished by the hundreds digit, with the first preferred embodiment identified by the one-hundreds and the second embodiment identified by the two-hundreds, and various components within each embodiment designated by the ones and tens digits. However, many of the components are alike or similar between embodiments, so numbering of the ones and tens digits have been maintained wherever possible, such that identical, like or similar functions may more readily be identified between the embodiments. If not otherwise expressed, those skilled in the art will readily recognize the similarities and understand that in many cases like numbered ones and tens digit components may be substituted from one embodiment to another in accord with the present teachings, except where such substitution would otherwise destroy operation of the embodiment. Consequently, those skilled in the art will readily determine the function and operation of many of the components illustrated herein without unnecessary additional description.

A second preferred embodiment snap cover converter 200 is illustrated in FIGS. 10-13. The most apparent differences between snap cover converter 100 and snap cover converter 200 is in the hand grip regions 170, 270. Hand grip 270 has a curled shape that defines a finger grip 272. Finger grip 272 provides adequate manual grasping, without requiring additional ribs such as friction ribs 172. A person will wrap a finger such as the pointer finger around hand grip 270, and then pull down to either install or uninstall snap converter 200 on a boat.

In the region surrounding loop opening 240, loop 230 is also thicker than loop 130. This is identified as retention region 242. This second preferred embodiment snap cover converter 200 is designed to work cooperatively with either a knob such as knob 110, or by directly engaging a male snap portion affixed to a boat. Many prior art male snap portions have a slightly larger diameter distal to the boat, and a slightly smaller diameter adjacent to the boat. This means that, if so desired, loop opening 240 may be passed around a prior art male snap portion to secure second preferred embodiment snap cover converter 200 directly thereto.

Figure 14:
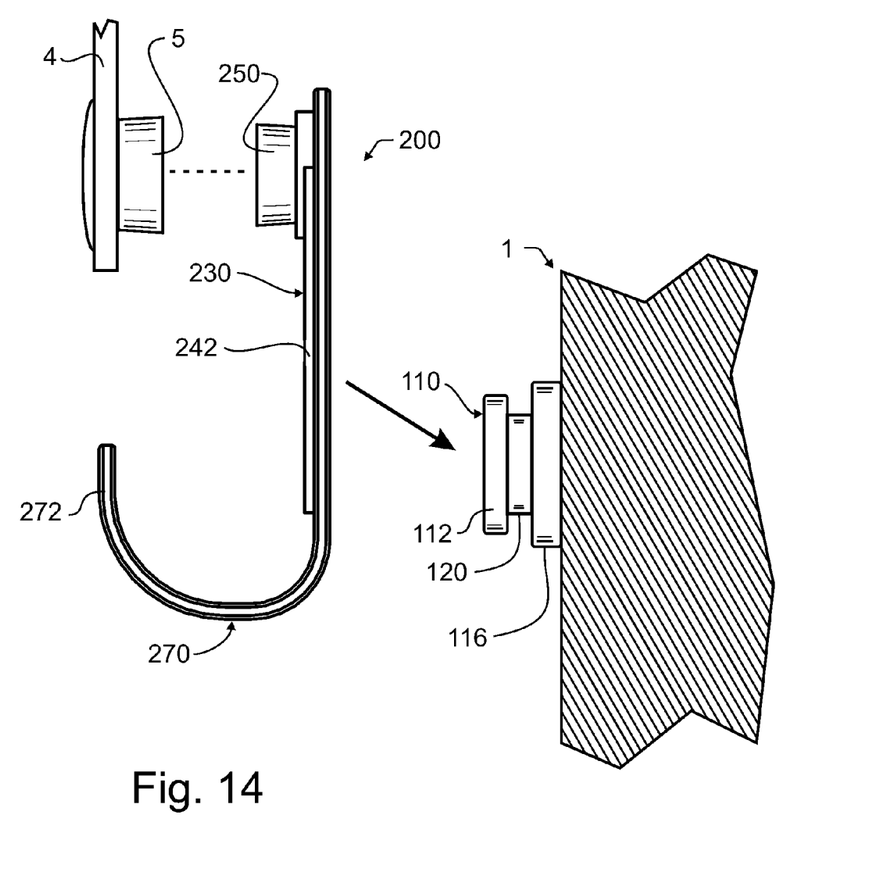
FIG. 14 illustrates the second preferred embodiment snap cover converter of FIG. 10 in further combination with a boat cover and boat from a side elevational view.

FIG. 14 illustrates by exploded view the installation of second preferred embodiment snap cover converter 200 onto a prior art boat cover 4 having a prior art female snap portion 5, and in turn onto a knob 110 affixed to a prior art boat 1. While second preferred embodiment snap cover converter 200 is illustrated, it will be understood that first preferred embodiment snap cover converter 100 may be directly substituted therefore.

When using second preferred embodiment snap cover converter 200, male snap portion 250 at the top of loop 230 is coupled to prior art female snap portion 5 found around the periphery of prior art boat covers such as cover 4. A person may pull on hand grip 270 to align the larger portion of loop opening 240 over knob top 112. Next, they will push loop 230 toward knob base 116. When loop 230 contacts knob base 116, it will not travel any closer to a boat hull. Knob base 116 will not pass through any part of loop opening 240, and so knob base 116 acts as a spacer between boat 1 and cover 4. When the person next releases hand grip 270, tension on prior art boat cover 4 will pull loop 230 up, shifting knob top 112 toward hand grip 270. This shift causes knob 110 to be displaced into the narrowed loop opening portion 248. While not incorporated into second preferred embodiment snap cover converter 200, one or more retention teeth may also optionally be provided. In this position, knob top 112 is larger than the size of narrowed loop opening portion 248, thereby preventing loop 230 from coming off of knob top 112.

While the foregoing details what are felt to be the preferred and alternative embodiments of the invention, no material limitations to the scope of the claimed invention are intended. Further, features and design alternatives that would be obvious to one of ordinary skill in the art are considered to be incorporated herein. The scope of the invention is set forth and particularly described in the claims herein below.

I claim:

1. In combination, a boat, a boat cover, and snap cover converter,
   said boat comprising:
      a hull providing buoyancy upon a water surface; and
      a knob affixed to and protruding from said boat;
   said boat cover comprising:
      a weather resistant covering; and
      a first snap portion secured to said covering;
   said snap cover converter comprising:
      a second snap portion removably mated with said boat cover first snap portion; and
      a loop affixed to said second snap portion and having a loop opening;
   said loop and knob in a first configuration selectively coupled together and in a second configuration disconnected from each other, said boat cover thereby secured to said boat through said snap cover converter in said first configuration;
   wherein said loop opening further comprises:
      a first portion with a dimension great enough to operatively receive and pass through an object of a first dimension while blocking an object having a dimension greater than said first dimension; and
      a second portion in communication with said first portion and configured to operatively receive and pass through an object of a dimension less than said first dimension while blocking an object having a dimension equal to said first dimension.

2. The combination boat, boat cover, and snap cover converter of claim 1, wherein said loop opening further comprises a keyhole shape, said first portion dimension further comprises a first portion diameter, and said first dimension further comprises a first diameter.

3. The combination boat, boat cover, and snap cover converter of claim 1, wherein said loop further comprises a retention rib protruding from said loop configured to operatively frictionally interfere with said knob and thereby retain said knob passing through said loop opening second portion.

4. The combination boat, boat cover, and snap cover converter of claim 1, wherein said loop opening further comprises at least one retention tooth protruding into said loop opening configured to operatively frictionally interfere with said knob and thereby retain said knob passing through said loop opening second portion.

5. The combination boat, boat cover, and snap cover converter of claim 1, wherein said loop further comprises a friction finish on said loop configured to operatively frictionally interfere with said knob and thereby retain said knob passing through said loop opening second portion.

6. The combination boat, boat cover, and snap cover converter of claim 2, wherein said knob further comprises:
   a knob top having a generally cylindrical exterior of said first diameter;
   a knob base having a generally cylindrical exterior of a second diameter greater than said first diameter; and
   a knob shoulder having a generally cylindrical exterior of a third diameter greater than said second diameter and less than said first diameter, said knob shoulder intermediate between said knob top and said knob base.

7. A snap cover converter, comprising:
   a snap portion having a connector of a one of a male snap connector and a female snap connector, said snap portion connector removably mating with the other of said male snap connector and said a female snap connector;
   a loop affixed to said snap portion and having a loop opening;
   said loop opening having a first portion with a diameter great enough to operatively receive and pass through an object of a first diameter while blocking an object having a diameter greater than said first diameter, and further having a second portion in communication with said first portion and configured to operatively receive and pass through an object of a diameter less than said first diameter while blocking an object having a diameter equal to said first diameter; and
   a hand grip secured to said loop and configured for manual grasping and manipulation, whereby when said snap portion is removably mated with the other of said male and female snap connectors a person may grasp said hand grip and align said loop opening with an object of said first diameter and pass said object of said first diameter through said loop opening.

8. The snap cover converter of claim 7, wherein said other of said male snap connector and said a female snap connector further comprises a boat cover snap portion affixed to a boat cover.

9. The snap cover converter of claim 7, wherein said loop opening further comprises a keyhole-shaped opening.

10. The snap cover converter of claim 7, wherein said loop opening further comprises at least one retention tooth protruding into said loop opening configured to operatively frictionally interfere with said knob and thereby retain said knob passing through said loop opening second portion.

11. The snap cover converter of claim 7, wherein said loop further comprises a friction finish on said loop configured to operatively frictionally interfere with said knob and thereby retain said knob passing through said loop opening second portion.

12. A knob configured to convert a snap cover to an alternative coupler, comprising:
   a knob top having a generally cylindrical exterior of a first diameter;
   a knob base having a generally cylindrical exterior of a second diameter greater than said first diameter;
   a knob shoulder having a generally cylindrical exterior of a third diameter greater than said second diameter and less than said first diameter, said knob shoulder intermediate between said knob top and said knob base; and a snap receiver defined in said knob base and adapted to operatively snap about a male snap connector.

13. The knob of claim 12, further comprising a fastener hole extending through said knob top, said knob base, and said knob shoulder.

14. In combination, a boat, a boat cover, and snap cover converter,
said boat comprising:
a hull providing buoyancy upon a water surface; and
a knob affixed to and protruding from said boat;
said boat cover comprising:
a weather resistant covering; and
a first snap portion secured to said covering;
said snap cover converter comprising:
a second snap portion removably mated with said boat cover first snap portion; and
a loop affixed to said second snap portion and having a loop opening;
said loop and knob in a first configuration selectively coupled together and in a second configuration disconnected from each other, said boat cover thereby secured to said boat through said snap cover converter in said first configuration;
wherein said knob further comprises:
a knob top having an exterior of a first dimension;
a knob base having an exterior of a second dimension greater than said first dimension;
a knob shoulder having an exterior of a third dimension greater than said second dimension and less than said first dimension, said knob shoulder intermediate between said knob top and said knob base; and
a snap receiver defined in said knob base and adapted to operatively snap about a male snap connector.

15. The combination boat, boat cover, and snap cover converter of claim 14, wherein said knob top further comprises a generally cylindrical exterior of a first diameter; said knob base further comprises a generally cylindrical exterior of a second diameter greater than said first diameter; and said knob shoulder further comprises a generally cylindrical exterior of a third diameter greater than said second diameter and less than said first diameter, said knob shoulder intermediate between said knob top and said knob base.

16. The combination boat, boat cover, and snap cover converter of claim 14, wherein said knob further comprises a fastener hole extending through said knob top, said knob base, and said knob shoulder.

\* \* \* \* \*